United States Patent
Yamazaki

(10) Patent No.: US 8,365,413 B2
(45) Date of Patent: Feb. 5, 2013

(54) FLUID DYNAMIC BEARING FILLED WITH LUBRICANT IN WORK AREA HAVING REDUCED PRESSURE, METHOD OF MANUFACTURING THE FLUID DYNAMIC BEARING, APPARATUS FOR MANUFACTURING THE FLUID DYNAMIC BEARING, AND ROTATING DEVICE

(75) Inventor: Hiroki Yamazaki, Shizuoka (JP)

(73) Assignee: Alphana Technology Co., Ltd., Shizuoka (JP)

( * ) Notice: Subject to any disclaimer, the term of this patent is extended or adjusted under 35 U.S.C. 154(b) by 345 days.

(21) Appl. No.: 12/698,045

(22) Filed: Feb. 1, 2010

(65) Prior Publication Data

US 2010/0254639 A1 Oct. 7, 2010

(30) Foreign Application Priority Data

Apr. 7, 2009 (JP) ................... 2009-092998

(51) Int. Cl.
*B21D 53/10* (2006.01)
(52) U.S. Cl. .......... 29/898.02; 29/898.1; 29/724; 141/7; 141/65; 141/67; 384/100
(58) Field of Classification Search ............... 29/898.02, 29/898.1, 724; 141/7, 65, 67; 384/100
See application file for complete search history.

(56) References Cited

U.S. PATENT DOCUMENTS

| | | | |
|---|---|---|---|
| 2,791,244 A * | 5/1957 | Von Schlichten et al. ........ 141/7 |
| 2,838,829 A * | 6/1958 | Goss et al. ...................... 419/27 |
| 5,601,125 A * | 2/1997 | Parsoneault et al. ............ 141/51 |
| 5,862,841 A * | 1/1999 | Wuester, Sr. .................. 141/284 |
| 5,894,868 A * | 4/1999 | Wuester, Sr. ...................... 141/4 |
| 6,804,987 B2 * | 10/2004 | Kloeppel et al. .................. 73/10 |
| 7,043,839 B2 * | 5/2006 | Hayashi et al. ............. 29/898.02 |
| 7,182,106 B2 * | 2/2007 | Misu et al. ......................... 141/4 |
| 7,191,806 B2 * | 3/2007 | Yoneyama et al. ............. 141/65 |
| 7,343,682 B2 * | 3/2008 | Sumi et al. ................... 29/898.1 |
| 7,344,002 B2 * | 3/2008 | Neumann et al. .............. 184/5.1 |
| 7,676,928 B2 * | 3/2010 | Misu et al. ................. 29/898.02 |
| 7,694,699 B2 * | 4/2010 | Lim et al. ........................ 141/59 |
| 7,753,088 B2 * | 7/2010 | Lim et al. ........................ 141/59 |
| 7,921,565 B2 * | 4/2011 | Teraya et al. ................ 29/898.1 |
| 2006/0196728 A1 * | 9/2006 | Numakawa et al. ......... 184/55.2 |

FOREIGN PATENT DOCUMENTS

| | | |
|---|---|---|
| JP | 2002-005170 | 1/2002 |
| JP | 2005-098393 | 4/2005 |
| JP | 2005-273908 | 10/2005 |

* cited by examiner

*Primary Examiner* — Derris Banks
*Assistant Examiner* — Azm Parvez
(74) *Attorney, Agent, or Firm* — Fulwider Patton LLP

(57) ABSTRACT

In an apparatus for manufacturing a fluid dynamic bearing, a housing portion defines a first work area. A vacuum pump discharges air in the first work area. A lubricant discharge device is arranged in the first work area, and discharges a lubricant into an inlet of a reservoir for storing the lubricant of the fluid dynamic bearing. At least one aperture is provided in the housing portion. A first door closes the aperture and a second door closes the aperture. Between the first door and the second door, when both have closed the aperture, a second work area is formed where the fluid dynamic bearing is placed.

20 Claims, 8 Drawing Sheets

FLUID DYNAMIC BEARING FILLED WITH LUBRICANT IN WORK AREA HAVING REDUCED PRESSURE, METHOD OF MANUFACTURING THE FLUID DYNAMIC BEARING, APPARATUS FOR MANUFACTURING THE FLUID DYNAMIC BEARING, AND ROTATING DEVICE

CROSS-REFERENCE TO RELATED APPLICATION

This application is based upon and claims the benefit of priority from the prior Japanese Patent Application No. 2009-092998, filed on Apr. 7, 2009, the entire content of which is incorporated herein by reference

BACKGROUND OF THE INVENTION

1. Field of the Invention

The present invention relates to an apparatus for manufacturing a fluid dynamic bearing, a manufacturing method using the apparatus, a fluid dynamic bearing manufactured by the manufacturing method, and a rotating device provided with the fluid dynamic bearing and, in particular, to a technique of filling a lubricant into the fluid dynamic bearing.

2. Description of the Related Art

As devices for recording and reproducing digital data, magnetic disk drive devices such as hard disk drives, and optical disk drive devices such as CD (Compact Disk) devices and DVD (Digital Versatile Disk) devices, are known. These devices are provided with a motor for rotating a disk. Recently, fluid dynamic bearings have been used in rotating devices such as motors in many cases. It is necessary to fill a lubricant into a narrow space in order to manufacture a fluid dynamic bearing.

As a method of filling lubricant into a fluid dynamic bearing, etc., various methods are proposed, as represented by Japanese Patent Application Publication No. 2002-005170, Japanese Patent Application Publication No. 2005-098393, and Japanese Patent Application Publication No. 2005-273908.

In order to fill a lubricant into the fluid dynamic bearing, it is necessary to repeat a depressurization operation and a repressurization operation in a work area where the lubricant dynamic bearing is to be filled with the lubricant. It takes a long time to depressurize the work area to a vacuum of a predetermined degree, decreasing the work efficiency in manufacturing the fluid dynamic bearing.

SUMMARY OF THE INVENTION

The present invention has been made in view of these situations, and a purpose of the invention is to provide a time-efficient technique of manufacturing a fluid dynamic bearing.

In order to solve the aforementioned problem, an apparatus for manufacturing a fluid dynamic bearing according to an embodiment of the present invention comprises: a housing portion configured to define a first work area; a vacuum pump configured to discharge air in the first work area; a lubricant discharge device arranged in the first work area so as to discharge a lubricant into an inlet of a reservoir for storing the lubricant of the fluid dynamic bearing; at least one aperture provided in the housing portion; a first door configured to close the aperture; and a second door configured to close the aperture. Between the first door and the second door, when both have closed the aperture, a second work area is formed where the fluid dynamic bearing is placed.

According to the embodiment, the fluid dynamic bearing can be placed into the first work area from the second work area. For example, if the first work area is set in advance so as to create a vacuum of a predetermined degree by the vacuum pump, a decrease in the degree of vacuum in the first work area can be suppressed to the amount of air in the second work area when the fluid dynamic bearing is placed into the first work area from the second work area.

Another embodiment of the present invention relates to a method of manufacturing a fluid dynamic bearing. The method of manufacturing a fluid dynamic bearing using the aforementioned apparatus for manufacturing a fluid dynamic bearing, comprises: closing the aperture by the first door; arranging the fluid dynamic bearing in the second work area; closing the second door; introducing the fluid dynamic bearing into the first work area, depressurized by the vacuum pump, immediately after the first door is opened; discharging, by the lubricant discharging apparatus, the lubricant into the inlet of the reservoir for storing the lubricant of the fluid dynamic bearing; rearranging the fluid dynamic bearing in the second work area; closing the aperture by the first door; and putting air into second work area in order to draw the lubricant into the reservoir for storing the lubricant of the fluid dynamic bearing.

According to the embodiment, a decrease in the degree of vacuum in the first work area can be suppressed to the amount of air in the second work area when the fluid dynamic bearing is placed from the second work area into the first work area, which is depressurized by the vacuum pump.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

Figure 1:
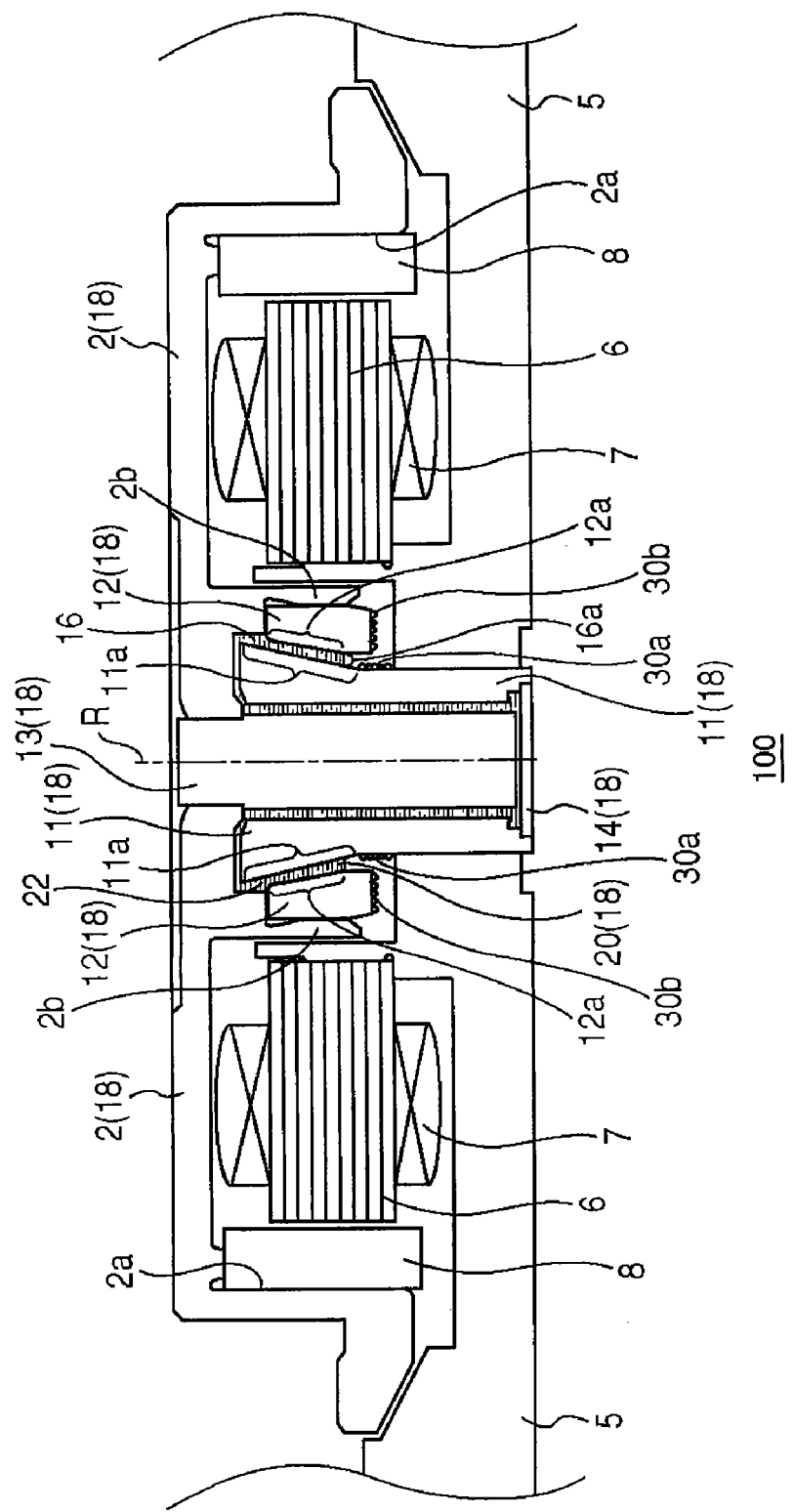
FIG. 1 is a cross-sectional view illustrating a disk drive device manufactured by a method of manufacturing a fluid dynamic bearing according to an embodiment.

The invention will now be described by reference to the preferred embodiments. This does not intend to limit the scope of the present invention, but to exemplify the invention.

The present invention will be described below with reference to the drawings based on the preferred embodiments and a comparative technique. The same or equivalent constituting elements and members illustrated in each drawing shall be denoted by the same reference numerals, and duplicative explanations will be omitted appropriately. Dimensions of members illustrated in each drawing are appropriately enlarged or reduced for ease of understanding. Part of the members not important for describing the comparative technique and embodiment are omitted from each drawing.

A fluid dynamic bearing manufactured by using the manufacturing method according to the embodiment is mounted in a rotating device such as a brushless motor, etc. Such a fluid dynamic bearing is preferably mounted in a disk drive device such as hard disk drive, and an optical disk drive device such as CD device and DVD device, the disk drive device and the optical disk drive being included in the rotating devices.

FIG. 1 is a cross-sectional view illustrating the disk drive device 100 manufactured by a method of manufacturing a fluid dynamic bearing according to the embodiment. The disk drive device 100 comprises a hub 2, a shaft 13, a circular-shaped magnet 8, a base plate 5, a laminated core 6, a coil 7, a sleeve 11, a plate 14, a lubricant 20, and a thrust ring 12. Hereinafter, descriptions will be made assuming that the side where the hub 2 is provided is the upper side relative to the base plate 5.

A rotor is configured to include the hub 2, the shaft 13, the thrust ring 12 and the circular-shaped magnet 8 such that these parts rotate around the rotational axis R integrally with each other during the rotation of the disk drive device 100. One end of the shaft 13 is fixed, in a press-fitted manner, to a hole provided at the center of the hub 2. The hub 2 has a cylindrical hanging portion 2b having a shape hanging down from the undersurface thereof. The thrust ring 12 is fixed to the inner circumferential surface of the hanging portion 2b.

The circular-shaped magnet 8 is fixed to the inner circumferential surface 2a of the approximately cup-shaped hub 2. The circular-shaped magnet 8 is formed of a rare earth material such as neodymium, iron, and boron and faces twelve salient poles of the laminated core 6 in the diameter direction, the laminated core 6 being described later. The circular-shaped magnet 8 is magnetized in eight poles in the circumferential direction in order to be driven.

A stator is configured to include the base plate 5, the laminated core 6, the coil 7, the sleeve 11, and the plate 14 such that the rotor is rotatably supported during the rotation of the disk drive device 100. The base plates 5 is integrated with a chassis of the disk drive device 100. The base plate 5 is provided with a hole centered on the rotational axis R, and the sleeve 11 is adhesively fixed to the inner circumferential surface of the hole. The shaft 13 is housed in the sleeve 11. The plate 14 is adhesively fixed to the lower surface of the sleeve 11 to seal the sleeve 11. The base plate 5 may be formed separately from the chassis of the disk drive device 100.

The laminated core 6 has a circular portion and twelve salient poles extending outwards in the radial direction from the circular portion. The laminated core 6 is formed by laminating nine thin electromagnetic steel sheets and by integrating the sheets with laser welding. Each salient pole is wound with the three-phase coil 7. A drive magnetic flux is generated along the salient pole when a three-phase drive current having an approximate sine wave shape flows through the coil 7. The laminated core 6 is adhesively fixed to the base plate 5.

The lubricant 20 is injected into a reservoir 16, which is the space between the shaft 13, the thrust ring 12, and the hub 2, which are part of the rotor, and the sleeve 11 and the plate 14, which are part of the stator. The fluid dynamic bearing 18, a bearing using the dynamic pressures generated in the lubricant 20, is configured to include the shaft 13, the thrust ring 12, the hub 2, the sleeve 11, the plate 14, and the lubricant 20.

On the inner circumferential surface of the sleeve 11, a pair of herringborn-shaped radial dynamic pressure grooves is formed, which are spaced apart from each other. On the upper end surface of the sleeve 11, herringborn-shaped thrust dynamic pressure grooves are formed. The rotor is supported in the thrust and radial directions by the dynamic pressures generated in the lubricant 20 by these dynamic pressure grooves during the rotation of the disk drive device 100. When the lubricant 20 is supplied to the reservoir 16, the lubricant 20 is also supplied to the radial dynamic pressure grooves and the thrust dynamic pressure grooves.

The outer circumferential surface 11a of the sleeve 11 close to the upper end thereof is designed to be an inclined surface, the diameter of which is larger toward the upper surface thereof. It is assumed that the slope of the inclined surface relative to the rotational axis R is is. The inner circumferential surface 12a of the thrust ring 12, which faces the outer circumferential surface 11a of the sleeve 11, is designed to be an inclined surface, the diameter of which is larger going upward. It is assumed that the slope of the inclined surface relative to the rotational axis R is qth. The disk drive device 100 is designed such that 0<qth<qis holds. Accordingly, an inlet space 22 sandwiched by the outer circumferential surface 11a of the sleeve 11 and the inner circumferential surface 12a of the thrust ring 12 has a shape with width larger going downward. With this shape, capillarity is created in which the lubricant 20 is drawn into the upward of the inlet space 22 and hence a structure is formed in which the lubricant 20, once filled in, is difficult to leak out. The portion near the lower end of the thrust ring 12 where the inclination of the inner circumferential surface 12a thereof ends is defined as an inlet 16a of the inlet space 22. The inlet 16a is also an inlet 16a of the reservoir 16 including the inlet space 22.

To prepare for the loss of the lubricant 20 due to evaporation, etc., the filling amount of the lubricant 20 is set to a degree where the liquid surface of the lubricant 20 is located in the middle of the inlet space 22.

A so-called oil migration phenomenon is known in which the lubricant 20, such as oil, spreads along the surface of a member. In order to prevent the lubricant 20 from leaking out by the oil migration phenomenon, a first oil-repellent area 30a and a second oil-repellent area 30b are formed near the inlet 16a of the reservoir 16. The first oil-repellent area 30a is formed by applying an oil-repellent material such as a fluororesin to the surface of the sleeve 11 near the lower end where the inclination of the outer circumferential surface 11a thereof has ended. The second oil-repellent area 30b is formed by applying the same material as used in the area 30a to the lower surface of the thrust ring 12. Because the first oil-repellent area 30a and the second oil-repellent area 30b repel the lubricant 20 even if the lubricant 20 spreads from the reservoir 16 due to the oil migration phenomenon, the leaking of the lubricant 20 can be suppressed.

A method of manufacturing a fluid dynamic bearing 18 included in the aforementioned disk drive device 100, according to a comparative technique, will be described. FIGS. 2A through 2D are process views illustrating an apparatus for and a method of manufacturing a fluid dynamic bearing according to the comparative technique.

Figure 2A:
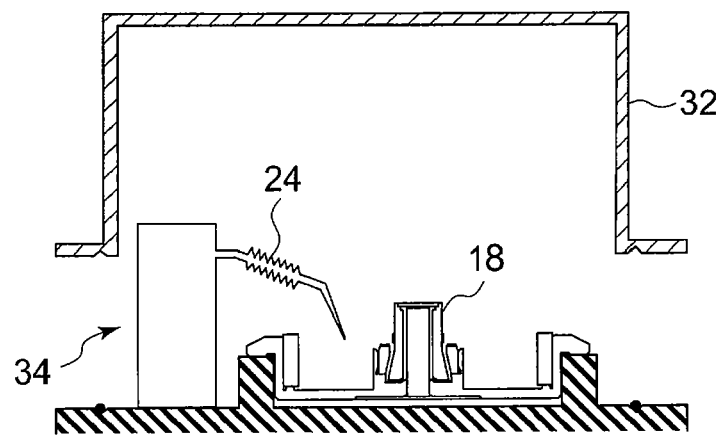
FIGS. 2A to 2D are process views illustrating an apparatus and a method of manufacturing a fluid dynamic bearing according to a comparative technique.
Figure 2B:
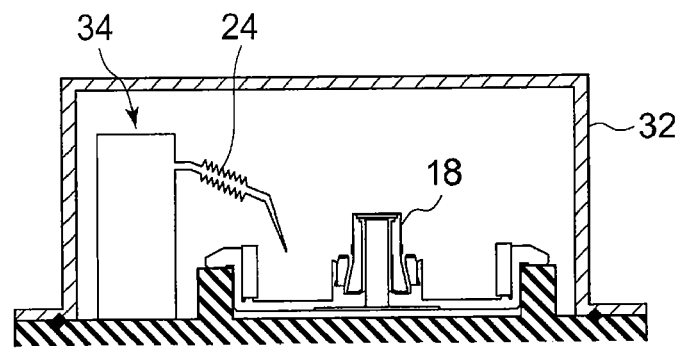
Figure 2C:
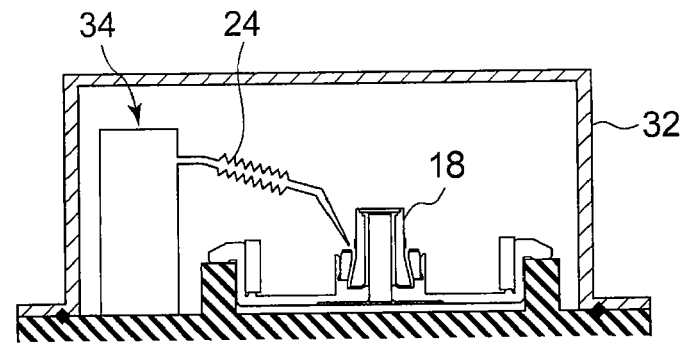
Figure 2D:
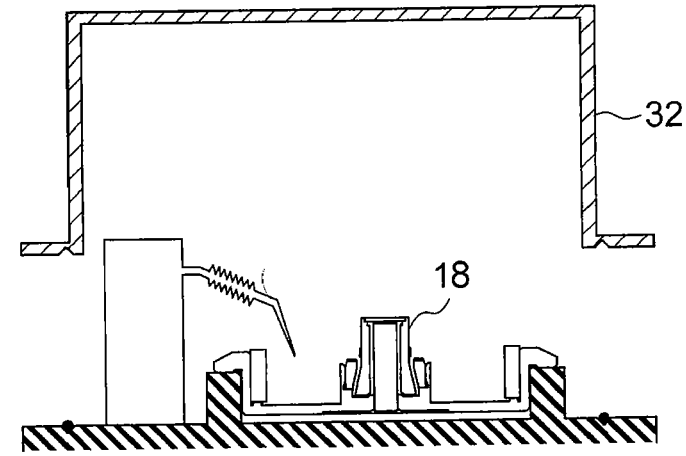

FIG. 2A illustrates a process of preparing for the injection of the lubricant 20. In this process, the illustrated work area is installed in a clean room having atmospheric pressure. The fluid dynamic bearing 18, prior to the injection of the lubricant 20, is mounted in the work area in a state where the undersurface of the bearing 18 is turned upwards. A sealed space is formed by covering the mounted fluid dynamic bearing 18 with a case 32. FIG. 2B illustrates a process of depressurizing the work area sealed by the case 32. In this case, it takes two to five minutes to depressurize the work area to a desired pressure level less than or equal to 100 (Pa). In addition, when the capacity of the work area is large, it may possibly take ten minutes or longer to do that. It may further take two to five minutes to depressurize the reservoir 16, a narrow space, to a level less than or equal to 100 (Pa). A lubricant injection device 34 is also housed in the sealed space. FIG. 2C illustrates a process of infusing the lubricant 20. In the infusing process, the nozzle 24 of the lubricant injection device 34 is brought closely to the inlet 16a of the reservoir 16 to infuse a desired amount of the lubricant 20 into the inlet 16a, allowing the lubricant thus infused to adhere to the vicinity of the inlet 16a by its surface tension. The desired amount of the lubricant 20 is set to an amount sufficient to fill the reservoir 16. FIG. 2D illustrates a process of drawing the lubricant 20 inside the reservoir 16. In the drawing process, the work area is opened to repressurize the area to approximately atmospheric pressure, thereby drawing the lubricant 20 inside the reservoir 16 by the pressure difference between that of the inside and of the outside of the reservoir 16. Thereby, the lubricant 20 is filled up to the back of the reservoir 16.

Herein, the present inventor has found out the following problems regarding the comparative technique. In the manufacturing apparatus and method according to the comparative technique, there is a problem that hours of work become long because the work area is depressurized from atmospheric pressure to a higher degree of vacuum during every operation of the fluid dynamic bearing 18. Further, many manufacturing apparatuses are necessary to manufacture the fluid dynamic bearings on a large scale, entailing an increase in size of the clean room as an installation space. With these, the manufacturing cost of the fluid dynamic bearing 18 is increased.

In view of such problems in the comparative technique, the present inventor has created an apparatus for manufacturing the fluid dynamic bearing 18 according to the embodiment.

Figure 3:
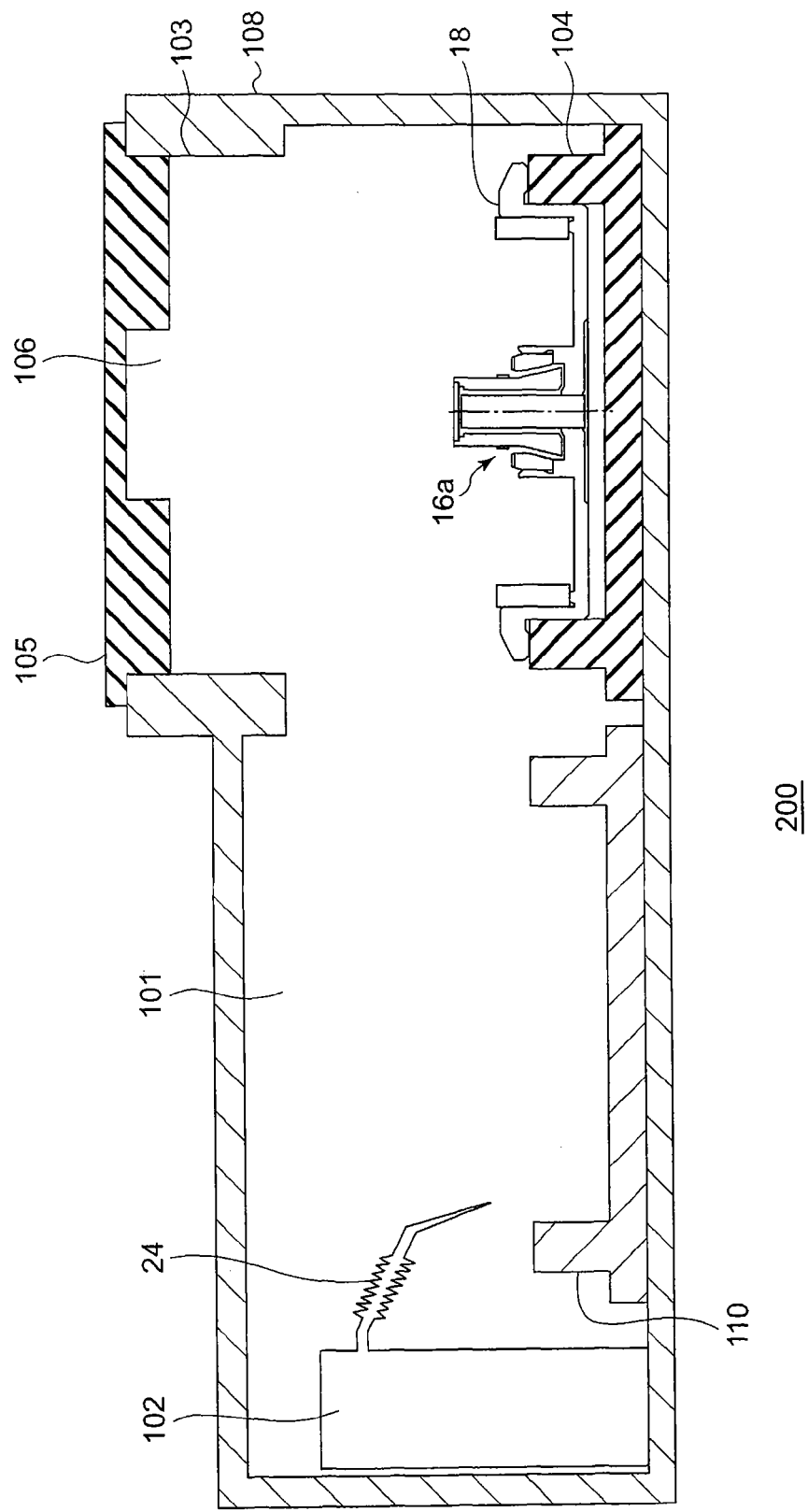
FIG. 3 is a cross-sectional view illustrating an apparatus for manufacturing the fluid dynamic bearing according to the embodiment.

The apparatus 200 for manufacturing the fluid dynamic bearing 18 according to the embodiment will be at first described. FIG. 3 is a cross-sectional view illustrating an apparatus 200 for manufacturing the fluid dynamic bearing 18 according to the embodiment. The apparatus 200 comprises a lubricant discharge device 102, an aperture 103, a first door 104, a second door 105, a housing portion 108, and a vacuum pump (not illustrated). In the drawing, the fluid dynamic bearing 18 is also illustrated in a state of being mounted on the first door 104.

The first work area 101 is defined by the box-shaped housing portion 108 arranged in the clean room filled with cleaned air. The air in the first work area 101 is discharged by the vacuum pump such that the work area 101 has a high degree of vacuum. The vacuum pump may be controlled so as to maintain the first work area 101 at a vacuum of a predetermined degree.

In the first work area 101, the lubricant discharge device 102, which discharges the lubricant 20, is installed. The lubricant discharge device 102 is installed in the first work area 101 to discharge the lubricant into the inlet 16a of the reservoir 16 for storing the lubricant of the fluid dynamic bearing 18. The fluid dynamic bearing 18 is discharged on a discharge working table 110 by the lubricant discharge device 102.

The housing portion 108 is provided with at least one aperture 103. The first door 104 closes the aperture 103 from inside the housing portion 108, whereas the second door 105 closes the aperture 103 from outside the housing portion 108. Both the first door 104 and the second door 105 can seal the same aperture 103 such that the inside of the first work area 101 can be maintained in an air-tight condition. Between the first door 104 and the second door 105, when both has closed the aperture 103, the second work area 106 is formed where the fluid dynamic bearing 18 can be placed. The second work area 106 may be defined by the first door 104, the second door 105, and the housing portion 108.

When the first door 104 is opened in a state where the first door 104 and the second door 105 have closed the aperture 103, the first work area 101 and the second work area 106 communicate with each other. The second door 105 is closed when the first door 104 is opened. Because the first door 104 and the second door 105 are not opened simultaneously, the aperture 103 is always sealed. Thereby, the sealing level of the first work area can be maintained when the fluid dynamic bearing 18 is introduced into the first work area 101.

In addition, the second work area 106 is smaller than the first work area 101. For example, the size of the second work area 106 may be of the degree of surrounding the fluid dynamic bearing 18, and therefore the second work area 106 may be sized in accordance with the fluid dynamic bearing 18. That is, the first door 104 and the second door 105 are formed in accordance with the size and shape of the fluid dynamic bearing 18. Thereby, the surplus space in the second work area 106 created when the fluid dynamic bearing 18 is arranged therein can be small. Thereby, when the first work area 101 and the second work area 106 communicate with each other, an amount of air flowing into the first working are 101 can be suppressed, allowing the increase in the pressure of the first work area 101 to be small. Accordingly, when injecting the lubricant into the fluid dynamic bearing 18, the hours of work necessary to depressurize the first work area 101 to the desired level less than or equal to 100 (Pa) can be drastically shortened.

The apparatus 200 for manufacturing the fluid dynamic bearing 18 may further comprise a pressure controller (not illustrated) configured to control the pressure of the second work area 106. The pressure controller adjusts the pressure of the second work area 106 to, for example, a level less than or equal to 10000 (Pa). As a result, when introducing the fluid dynamic bearing 18 into the first work area 101, an increase in the pressure of the first work area 101 can be suppressed to a minimum, allowing the hours of work necessary to depressurize the first work area 101 to the desired level less than or equal to 100 (Pa) to be further shortened.

FIGS. 4A through 5D are cross-sectional views illustrating the apparatus 200 for manufacturing the fluid dynamic bearing 18 according to the embodiment. FIGS. 4A through 4D illustrate the first half of the method of manufacturing the fluid dynamic bearing 18 according to the embodiment whereas FIGS. 5A through 5D illustrate the second half thereof The lubricant discharge device 102 and the discharge working table 110 are omitted in FIGS. 4A and 4B and FIGS. 5B through 5D.

Figure 4A:
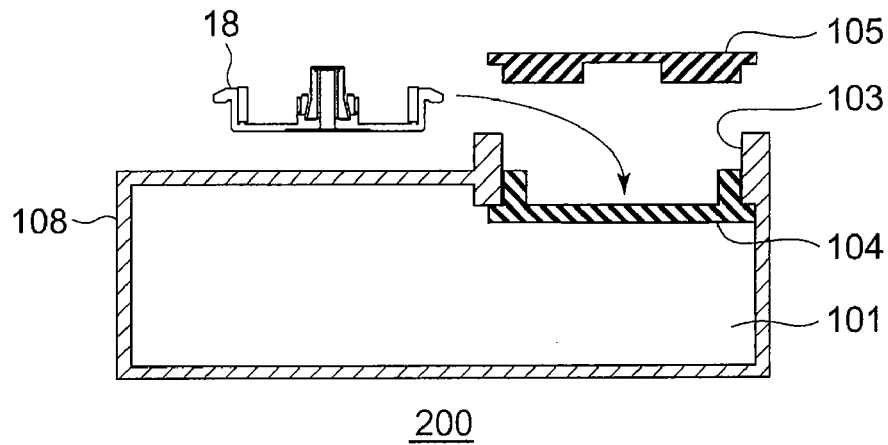
FIGS. 4A through 4D are views illustrating the first half of the method of manufacturing the fluid dynamic bearing according to the embodiment.

FIG. 4A illustrates a process of preparing for the injection of the lubricant 20 into the fluid dynamic bearing 18. The manufacturing apparatus 200 is installed in a clean room, and the first work area 101 is depressurized in advance to a desired degree of vacuum, for example, less than or equal to 100 (Pa). In FIG. 4A, the aperture 103 is closed by the first door 104 and the second door 105 is opened. The fluid dynamic bearing 18, prior to the injection of the lubricant 20, is arranged in the second work area 106 for the fluid dynamic bearing 18 on the first door 104, in a state where the inlet 16a of the reservoir 16 is turned upwards.

Figure 4B:
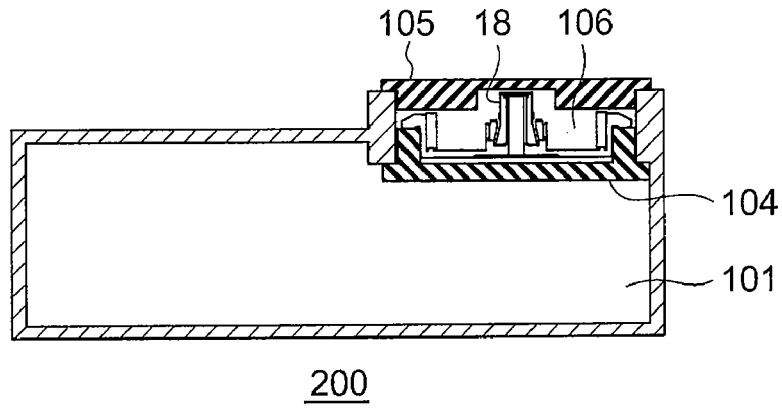
Figure 4C:
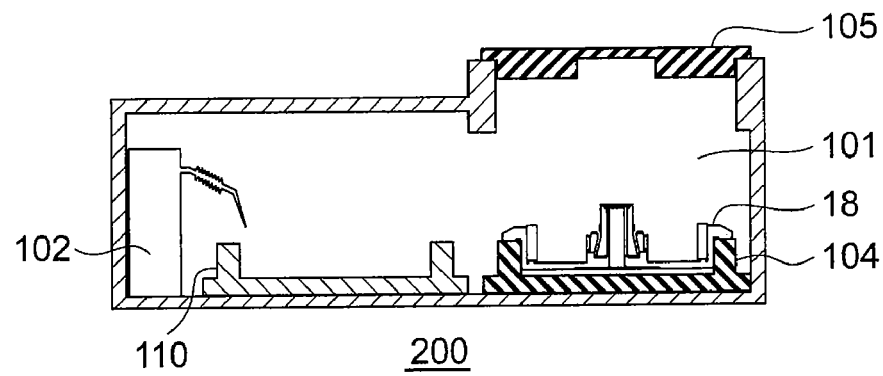

FIG. 4B illustrates a state where the second door 105 is closed. After mounting the fluid dynamic bearing 18 in the second work area 106, the second door 105 is closed from outside the housing portion 108 to seal the second work area 106. FIG. 4C illustrates a state where the first door 104 is opened. The fluid dynamic bearing 18 is introduced into the first work area 101 immediately after the first door is opened inside the housing portion 108. In this case, although the first work area 101 and the second work area 106 communicate with each other, the communicating work areas are sealed by the second door 105.

Figure 4D:
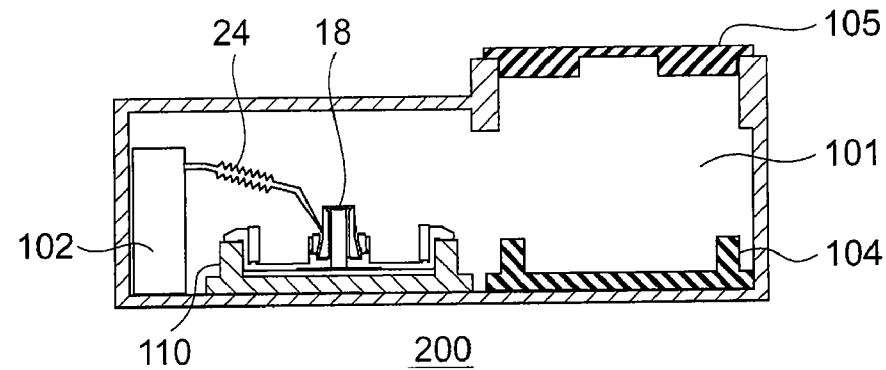

FIG. 4D illustrates a process of discharging, by the lubricant discharge device 102, the lubricant 20 into the inlet 16a of the reservoir 16 for storing the lubricant 20 of the fluid dynamic bearing 18. In FIG. 4D, the fluid dynamic bearing 18 is mounted onto the discharge working table 110 from the first door 104. In this discharging process, the nozzle 24 of the lubricant discharge device 102 is brought closely to the outside of the inlet 16a of the reservoir 16 to infuse a desired amount of the lubricant 20, allowing the lubricant 20 thus infused to adhere to the vicinity of the inlet 16a by its surface tension. The desired amount of the lubricant 20 is set to an amount sufficient to fill the reservoir 16.

Figure 5A:
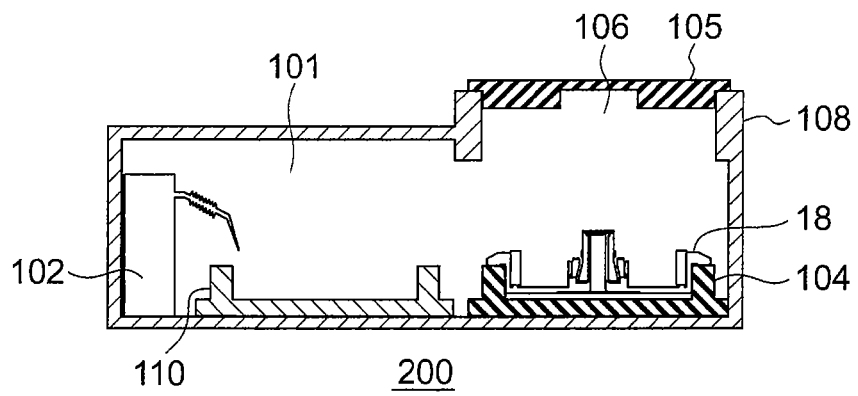
FIGS. 5A through 5D are views illustrating the second half of the method of manufacturing the fluid dynamic bearing according to the embodiment.
Figure 5B:
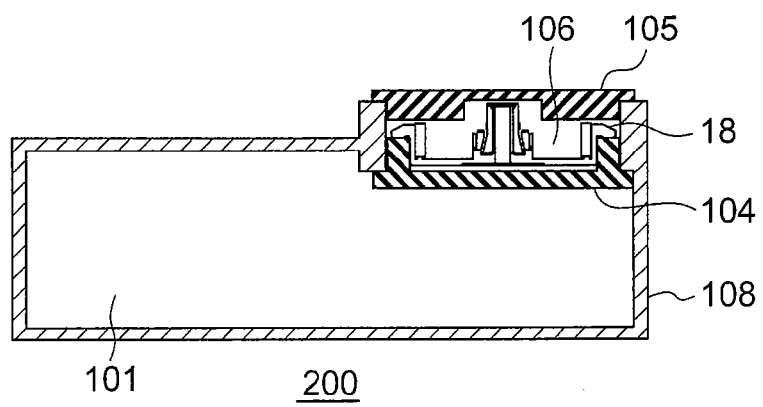

FIG. 5A illustrates a state where the fluid dynamic bearing 18 is rearranged on the first door 104. The fluid dynamic bearing 18 in which the lubricant 20 is discharged is returned onto the first door 104 from the discharge working table 110 and is rearranged in the second work area 106. FIG. 5B illustrates a state where the aperture 103 is closed by the first door 104. The first door 104 on which the fluid dynamic bearing 18 is mounted closes the aperture 103 from inside the housing portion 108. Thereby, the first work area 101 and the second work area 106, which have communicated with each other, are shielded from each other. At the time, the second work area 106 is also maintained at the same degree of vacuum as the first work area 101.

Figure 5C:
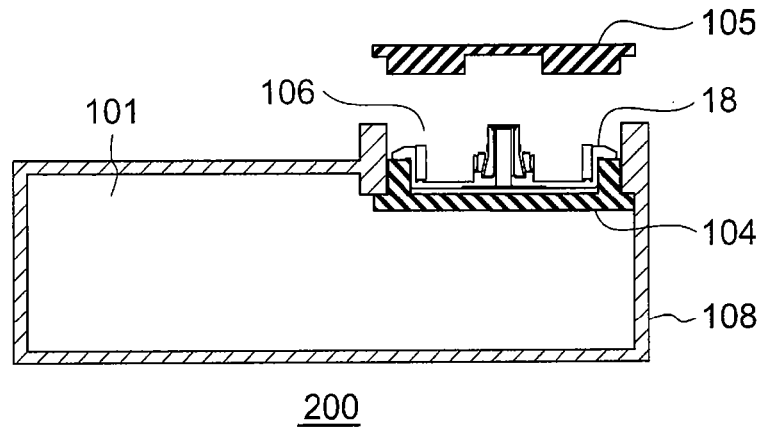
Figure 5D:
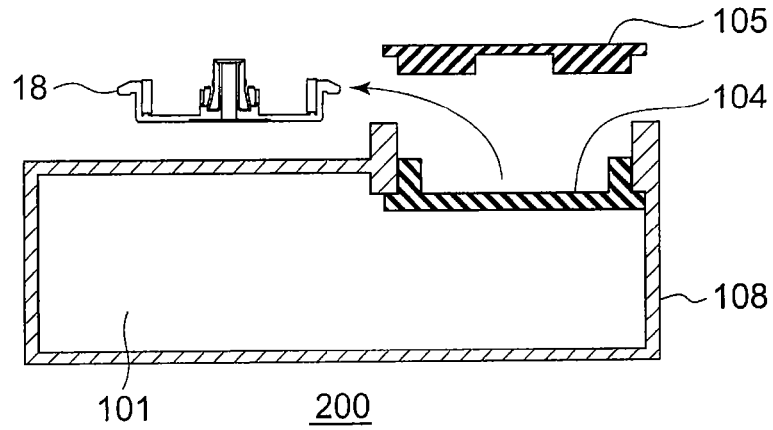

FIG. 5C illustrates a process of introducing air into the second work area 106 such that the lubricant 20 is drawn inside the reservoir 16 to fill the reservoir 16. In this process, the aperture 103 is opened to repressurize the second work area 106 to approximately atmospheric pressure, thereby drawing the lubricant 20 inside the reservoir 16 by the pressure difference between that of the inside and of outside of the reservoir 16. Thereby, the lubricant 20 is filled in the reservoir 16. Alternatively, an open valve (not illustrated) may be provided on the second door 105 such that air is introduced into the second work area 106 by adjusting the open valve prior to opening the second door 105 to repressurize the work area 106. This is preferable in terms of gradually introducing the air and preventing the lubricant 20 from sucking the air in. FIG. 5D illustrates a process of taking out the fluid dynamic bearing 18 in which the lubricant 20 has been drawn.

As stated above, in the aperture 103 of the housing portion 108, either the first door 104 or the second door 105 is closed, allowing for the first work area 101 to always be maintained at the desired level of vacuum. Accordingly, it is no longer necessary to depressurize the first work area 101 every time the fluid dynamic bearing 18 is introduced into the first work area 101, allowing the hours of work to be shortened.

FIGS. 4A through 5D describe the embodiment in which the fluid dynamic bearing 18 is transported onto another discharge working table 110 provided in the first work area 101 in order to discharge the lubricant 20 into the fluid dynamic bearing 18. Hereinafter, another variation will be described. For example, the lubricant 20 may be discharged into the fluid dynamic bearing 18 from the lubricant discharge device 102 while the fluid dynamic bearing 18 is being mounted on the first door 104, which has been opened. In this case, the first work area 101 may be formed so as to have a size in which the lubricant discharge device 102, the first door 104, and the fluid dynamic bearing 18 can be housed, allowing the manufacturing apparatus 200 to be small in size. This is preferable because the space where the manufacturing apparatus 200 is installed can be small. On the other hand, a plurality of fluid dynamic bearings 18 may be introduced into the first work area 101. For example, an index table that is rotated at every certain angle may be provided in the first work area 101 such that a plurality of discharge working tables 110 are provided on the index table. The fluid dynamic bearing 18 is mounted, from the first door 104, onto the discharge working table 110 at a predetermined position of the rotatable index table, so that the lubricant 20 is discharged into the fluid dynamic bearing 18 when the discharge working table 110 is rotated up to the stage of the lubricant discharge process. Thereafter, the discharge working table 110 is rotated up to the stage of the load change process where the fluid dynamic bearing 18 is remounted onto the first door 104 from the discharge working table 110. As stated above, by using the index table, a plurality of fluid dynamic bearings 18 can be efficiently manufactured on an assembly line. Further, a large amount of the fluid dynamic bearings 18 can be manufactured with a small number of the manufacturing apparatuses 200, and hence an increase in the size of the clean room as the installation space for the manufacturing apparatuses 200 can be prevented. Alternatively, the fluid dynamic bearing 18 may be arranged on the first door 104, being mounted on a mount base in a state where the inlet 16a of the reservoir 16 is turned upwards. In this case, the fluid dynamic bearing 18, mounted on the mount base, is transported in the first work area 101 to be discharged with the lubricant 20. For example, the fluid dynamic bearing 18, mounted on the mount base, may be transported to the index table to be discharged with the lubricant 20.

Although the aperture 103 is used as the aperture for the introduction of the fluid dynamic bearing 18 into the first work area 101 as well as the aperture for delivery of the fluid dynamic bearing 18, an aperture for introduction or one for delivery may be individually provided. For example, the aperture for introduction is designed to solely perform the processes of FIGS. 4A through 4C in which the fluid dynamic bearing 18 is introduced. After the fluid dynamic bearing 18 is discharged with the lubricant 20 in the first work area 101, the other aperture for delivery performs the processes of FIGS. 5A through 5D to deliver the fluid dynamic bearing 18. The aperture for introduction and that for delivery are provided with the first door 104 and the second door 105, respectively. It is preferable in terms of completing the work in less time that the aperture for introduction and that for delivery are individually provided. It is particularly preferable in terms of enhancing the work efficiency when the fluid dynamic bearings 18 are manufactured on a large scale by using the aforementioned index table.

It is desirable that the temperature of the lubricant 20 to be discharged from the lubricant discharge device 102 is within the range of 40 degree Celsius to 120 degree Celsius. When the temperature of the lubricant 20 is greater than or equal to 40 degree Celsius, the viscosity thereof is sufficiently lowered, allowing for the aforementioned discharging and drawing to be preformed smoothly and efficiently. In addition, when the temperature of the lubricant 20 is maintained at a temperature less than or equal to 120 degree Celsius, too much evaporation of the lubricant 20 can be avoided, which is advantageous in terms of suppressing the evaporation amount of the lubricant 20.

FIGS. 6A through 7D are cross-sectional views illustrating a variation of the apparatus 200 for manufacturing the fluid dynamic bearing 18 according to the embodiment. FIGS. 6A through 6D illustrate the first half of the process of a variation of the method of manufacturing the fluid dynamic bearing 18 according to the embodiment whereas FIGS. 7A through 7D illustrate the second half of the process thereof. In FIGS. 6A and 6B and 7B through 7G, the lubricant discharge device 102 and the discharge working table 110 are omitted.

The manufacturing apparatus 200 according to the embodiment comprises a valve 112 and a pump 107 in addition to the lubricant discharge device 102, the aperture 103, the first door 104, the second door 105, the housing portion 108, and the vacuum pump (not illustrated).

That is, the pressure controller includes a pump 107 configured to perform at least either the introduction of air or the discharge of air in the second work area 106. As a result, the pressure of the second work area 106 can be adjusted to, for example, a level less than or equal to 300 (Pa), thereby allowing for the hours of work necessary to depressurize the first work area 101 to the desired level of less than or equal to 100 (Pa) when the first work area 101 and the second work area 106 communicate with each other, to be further shortened. Air may be supplied to or discharged from the second work area 106 by the pump 107 from a supply/discharge hole provided on the second door 105. Further, the pressure controller may adjust the supply/discharge amount of the pump 107 by controlling the opening and closing of the valve 112.

Figure 6A:
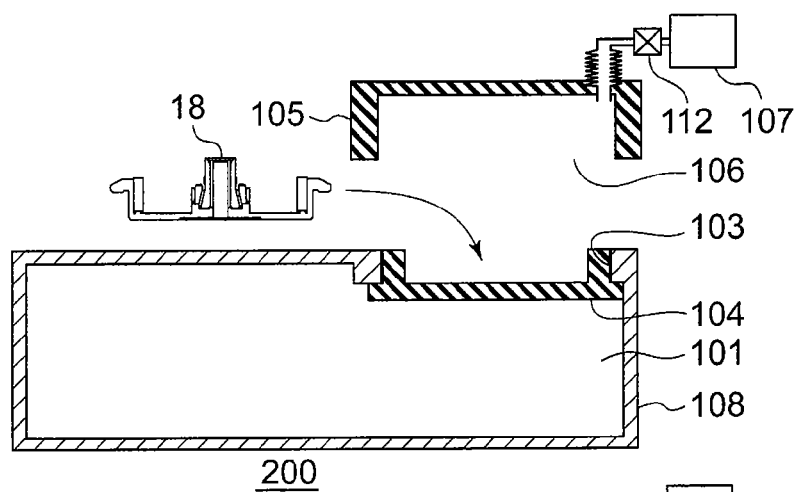
FIGS. 6A through 6D are views illustrating the first half of a variation of the method of manufacturing the fluid dynamic bearing according to the embodiment.

FIG. 6A illustrates a process of preparing for the manufacture of the fluid dynamic bearing 18. The manufacturing apparatus 200 is installed in the clean room, and the first work area 101 is depressurized by the vacuum pump in advance to the desired high degree of vacuum, for example, less than or equal to 100 (Pa). The first door 104 is set so as to close the aperture 103 and the second door 105 is set so as to open it. The fluid dynamic bearing 18, prior to being discharged with the lubricant 20, is mounted in the second work area 106 on the first door 104 in a state where the inlet 16a of the reservoir 16 is turned upwards.

Figure 6B:
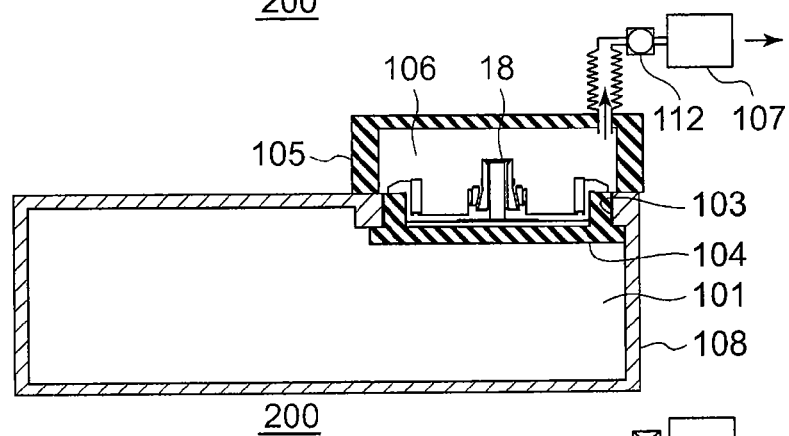
Figure 6C:
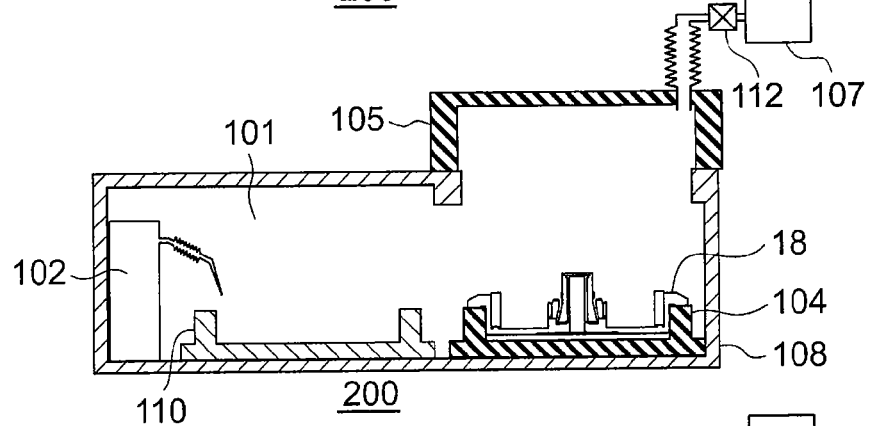
Figure 6D:
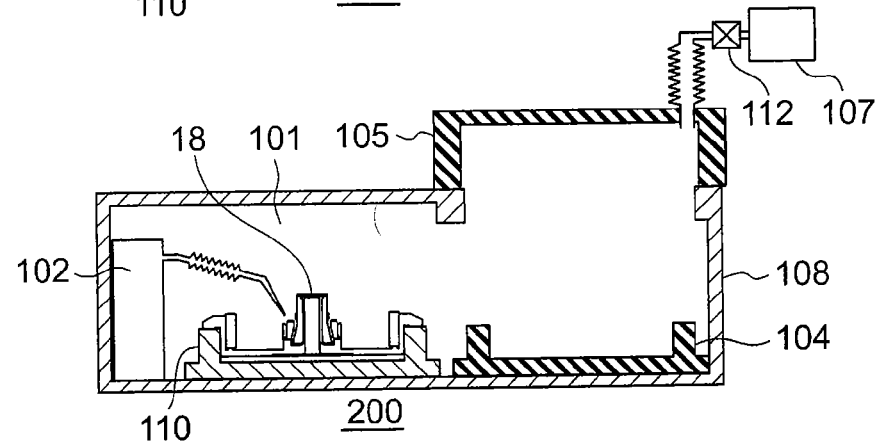

FIG. 6B illustrates a state where the second door 105 is closed. By closing the second door 105 in addition to the first door 104, the second work area 106 is in a sealed state. In this state, the pump 107 discharges the air in the second work area 106 in order to adjust the degree of vacuum in the second work area 106 to approximately 300 (Pa). Thereby, even if the first door 104 is opened when the fluid dynamic bearing 18 is introduced into the first work area 101, an increase in the pressure of the first work area 101 can be suppressed. FIG. 6C illustrates a state where the fluid dynamic bearing 18 is introduced into the first work area 101 immediately after the first door 104 is opened. At the time, although the first work area 101 and the second work area 106 communicate with each other, the communicating work areas are sealed by the second door 105. FIG. 6D illustrates a process of discharging the lubricant 20 into the inlet 16a of the reservoir 16 of the fluid dynamic bearing 18 by the lubricant discharge device 102. In FIG. 6D, the fluid dynamic bearing 18 is mounted onto the discharge working table 110 from the first door 104. In the discharge process, the nozzle 24 of the lubricant discharge device 102 is brought closely to the outside of the inlet 16a of the reservoir 16 to infuse a desired amount of the lubricant 20 into the inlet 16a, allowing the lubricant thus infused to adhere to the vicinity of the inlet 16a by its surface tension. The desired amount of the lubricant 20 is set to an amount sufficient to fill the reservoir 16.

Figure 7A:
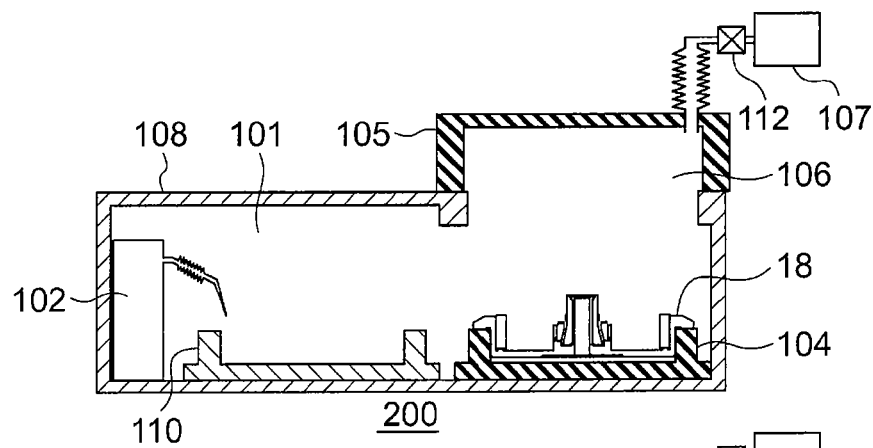
FIGS. 7A through 7D are views illustrating the second half of the variation of the method of manufacturing the fluid dynamic bearing according to the embodiment.
Figure 7B:
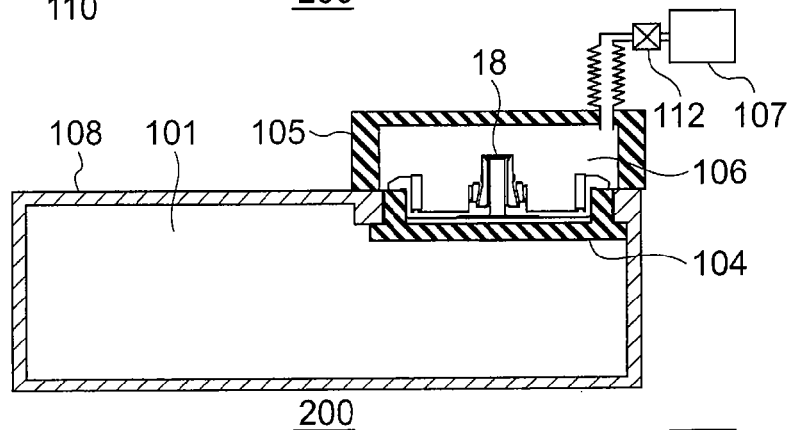

FIG. 7A illustrates a state where the fluid dynamic bearing 18 is rearranged on the first door 104. The fluid dynamic bearing 18 discharged with the lubricant 20 is returned onto the first door 104 from the discharge working table, thereafter being rearranged in the second work area 106. FIG. 7B illustrates a state where the aperture 103 is closed by the first door 104. By closing the first door 104, the first work area 101 and the second work area 106, which have communicated with each other, are shielded from each other.

Figure 7C:
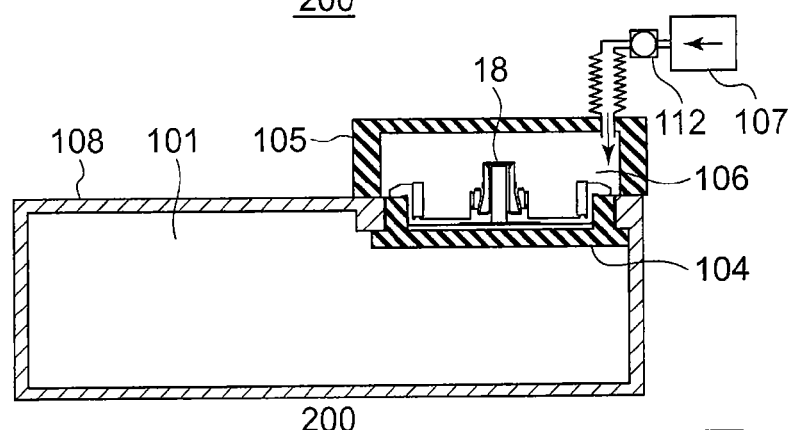
Figure 7D:
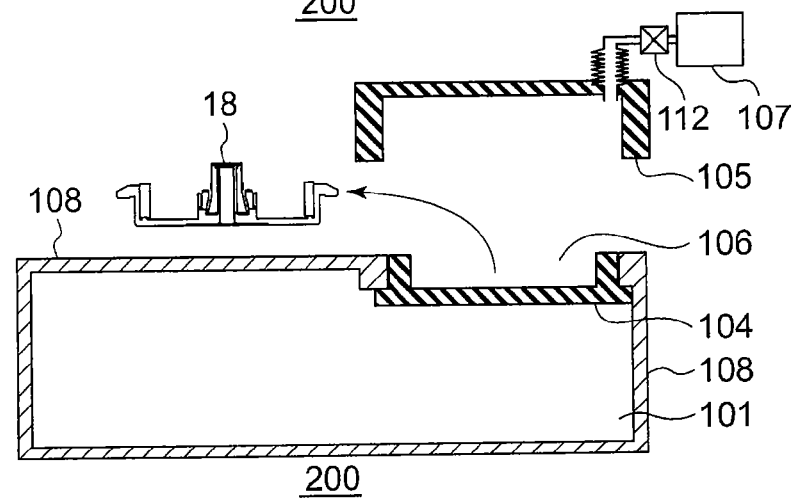

FIG. 7C illustrates a process where the lubricant 20 is introduced inside the reservoir 16 to fill the reservoir 16 by introducing air into the second work area 106. The valve 112, acting as the pressure controller, is opened such that the pressure of the second work area 106 is controlled to, for example, approximately 10000 (Pa). Thereby, the lubricant 20 is drawn inside the reservoir 16 by the pressure difference between that of the inside and of the outside of the reservoir 16. Thereby, the lubricant 20 is filled in the reservoir 16. In the apparatus 200 for manufacturing the fluid dynamic bearing 18 according to the embodiment, the possibility that air may be sucked into the lubricant 20 due to a drastic change in the pressure created when the lubricant 20 is drawn inside the reservoir 16 can be reduced by controlling the internal pressure of the second work area 106 individually from the first work area 101. FIG. 7D illustrates a process of taking out the fluid dynamic bearing 18 into which the lubricant 20 has been drawn by opening the second door 105.

In the embodiment, although the aperture 103 is used as the aperture for the introduction of the fluid dynamic bearing 18 into the first work area 101 as well as the aperture for delivery of the fluid dynamic bearing 18, an aperture for introduction or one for delivery may be individually provided. For example, the aperture for introduction is designed to solely perform the processes of FIGS. 6A through 6C in which the fluid dynamic bearing 18 is introduced. After the fluid dynamic bearing 18 is discharged with the lubricant 20 in the first work area 101, the other aperture for delivery performs the processes of FIGS. 7A through 7D to deliver the fluid dynamic bearing 18. The aperture for introduction and that for delivery are provided with the first door 104 and the second door 105, respectively. It is preferable in terms of completing the work in less time with the aperture for introduction and that for delivery being individually provided. It is particularly preferable in terms of enhancing the work efficiency when the fluid dynamic bearings 18 are manufactured on a large scale by using the aforementioned index table. Although FIGS. 6A through 7D describe the embodiment in which the fluid dynamic bearing 18 is transported onto another discharge working table 110 provided in the first work area 101 such that the lubricant 20 is discharged into the fluid dynamic bearing 18, the lubricant 20 may be discharged from the lubricant discharge device 102 while the fluid dynamic bearing 18 is being mounted on the first door 104.

When the ratio at which the capacity of the reservoir 16 is occupied by the capacity of the inlet space 22 is greater than 50 percent, the liquid surface of the lubricant 20 is located in the middle of the inlet space 22 after the drawing process in FIG. 7D. Accordingly, it can be considered that the fluid dynamic bearing 18 obtained after the drawing process has a sufficient amount of the lubricant 20 if the ratio of the capacity of the inlet space 22 to that of the reservoir 16 is, for example, a value greater than or equal to 60 percent, even taking into consideration of variations or suitable margins in manufacturing the fluid dynamic bearings. However, when the aforementioned ratio is smaller than 50 percent, or when one intends to obtain a higher margin, the process of adding the lubricant 20 may be possibly needed.

In order to deal with this, the process of discharging additional lubricant 20 may be further included following the process of drawing the lubricant 20 into the reservoir 16 for storing the lubricant 20 of the fluid dynamic bearing 18, illustrated in FIG. 7C. In the process of discharging additional lubricant 20, the tip of the nozzle of the lubricant discharge device (not illustrated) is inserted inside the reservoir 16, in particular, beneath the liquid surface of the lubricant 20 that has been filled in. Thereafter, the lubricant 20 may be discharged additionally from the nozzle until the desired amount of the lubricant 20 is obtained. Thereby, the work can be more easily performed. In addition, because the tip of the nozzle is inserted inside the liquid of the lubricant 20 that has been filled in, it is difficult for air to be sucked in when the additional lubricant 20 is discharged. In the manufacturing apparatus 200, the liquid height of the lubricant 20 drawn into the reservoir 16 may be measured by a measuring means such as a laser sensor, so that the lubricant 20 will be added if the liquid height is lower than the desired height.

Figure 8A:
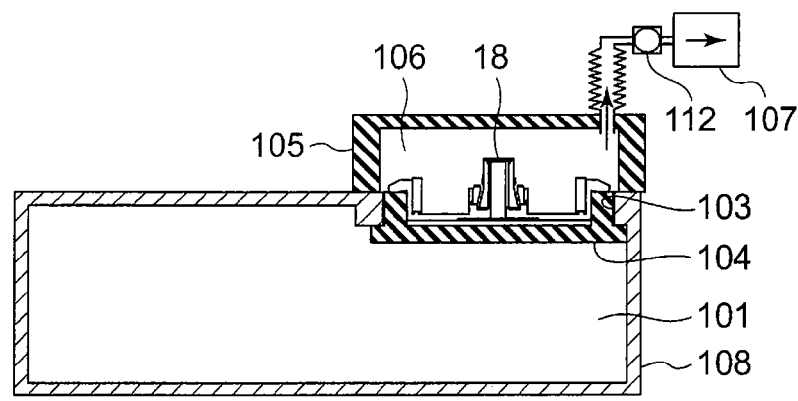
FIGS. 8A through 8D are process views illustrating a variation of the method of manufacturing the fluid dynamic bearing according to the embodiment.
Figure 8B:
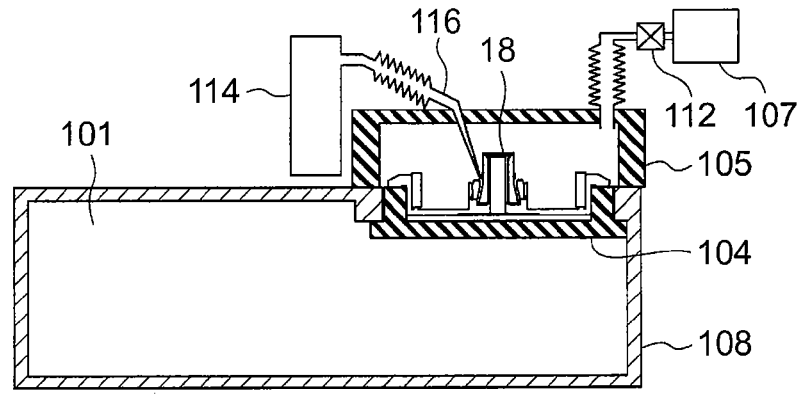
Figure 8C:
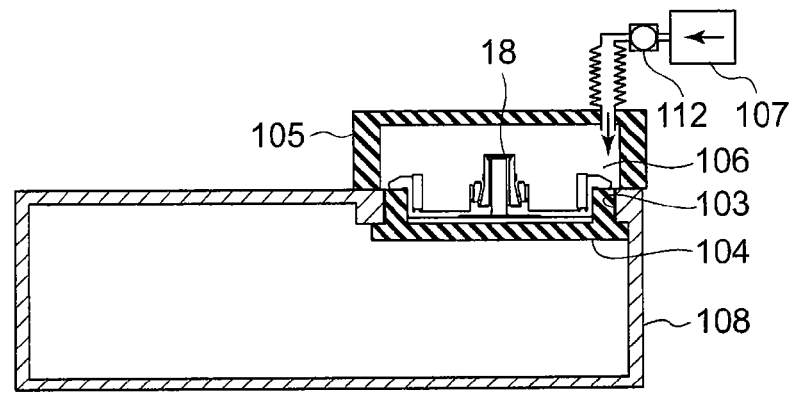
Figure 8D:
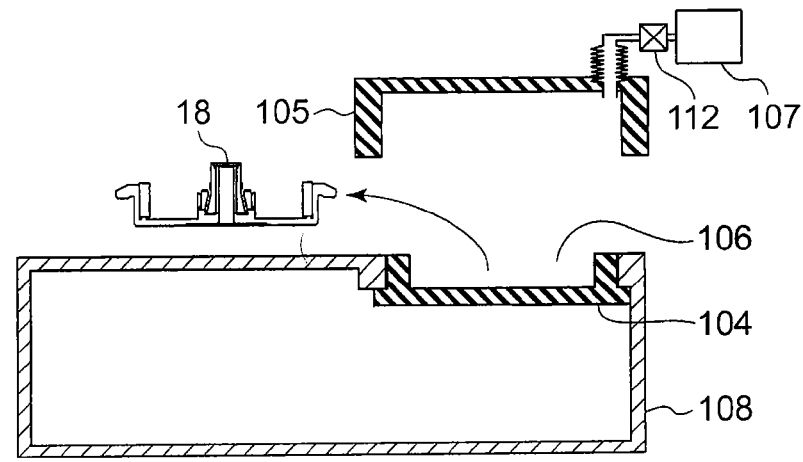

FIGS. 8A through 8D are process views illustrating a variation of the method of manufacturing the fluid dynamic bearing 18 according to the embodiment. The processes illustrated in FIGS. 8A through 8D represent the processes following the process of FIG. 7C, and the processes preceding that of FIG. 7C may be the same as those of FIGS. 6A through 6D and 7A through 7C. FIGS. 8A through 8D illustrate the process in which the lubricant 20 is again discharged while the fluid dynamic bearing 18 is rearranged under a reduced pressure environment. FIG. 8A illustrates the process in which the pressure of the second work area 106 is reduced by the pump 107 to a level, for example, less than or equal to 100 (Pa) while the valve 112 is being opened after the process of FIG. 7C. FIG. 8B illustrates the process in which additional lubricant 20 is discharged by the lubricant discharge device 114 located outside the housing portion 108. Specifically, the nozzle 116 of the lubricant discharge device 114 is inserted through a nozzle hole (not illustrated) provided on the second door 105, so that the lubricant 20 is discharged after determining the position of the reservoir 16. Alternatively, the air is pumped by the pump 107 after the nozzle 116 is inserted through the nozzle hole provided on the second door 105. FIG. 8C illustrates the process in which the valve 112 is opened to raise the pressure of the second work area 106 to, for example, atmospheric pressure. Thereby, the additional lubricant 20 discharged is drawn inside and filled in the reservoir 16 by the pressure difference between that of the inside and of the outside of the reservoir 16. Because the lubricant 20 is discharged under a reduced pressure environment, the possibility that air may be sucked into the lubricant 20 can be reduced even when the lubricant 20 is again drawn. FIG. 8D illustrates the process of taking out the fluid dynamic bearing 18 by opening the second door 105.

Herein, another variation will be described in addition to the aforementioned embodiments. There is a problem that the work for discharging the lubricant will take a long time in order to prevent the fluid dynamic bearing 18 from being damaged by the approaching nozzle for discharging the lubricant 20 into the fluid dynamic bearing 18. To deal with this, the process of discharging the lubricant 20 into the inlet 16a of the reservoir 16 of the fluid dynamic bearing 18 may include: a process of determining a target position for a nozzle of the lubricant discharge device, located remotely from the reservoir 16, so that droplets of the lubricant 20 thus discharged are placed into the inlet 16a of the reservoir 16; and a process of ejecting the droplets of the lubricant 20 from the nozzle in an amount in which the lubricant 20 does not overflow from the reservoir 16. A remote location from the reservoir 16 means, for example, a place where the tip of the nozzle does not enter the space between the sleeve 11 and the thrust ring 12. By discharging the lubricant 20 from the location remotely from the reservoir 16, the fluid dynamic bearing 18 is not damaged and the work of discharging the lubricant 20 can be easily performed.

The lubricant tank of the lubricant discharge device comprises a pressure control means for controlling the pressure of the lubricant 20 in the tank. By applying a voltage pulse to the pressure control means, the liquid pressure of the lubricant 20 in the lubricant tank is momentarily enhanced. The lubricant 20 can be extruded from the nozzle by momentarily enhancing the liquid pressure in this way. The extruded lubricant 20 forms fine droplets 42, which fly to the inlet space 22. The amount of the lubricant 20 to be ejected to a single fluid dynamic bearing 18 from the nozzle is, in advance, determined to be the value in which the lubricant 20 does not overflow from the inlet space 22. The lubricant 20 to be discharged from the nozzle may be discharged in a divided manner of two or more times. Further, multiple nozzles may be used as far as space allows.

Methods of ejecting the lubricant 20 are not limited to the aforementioned method. For example, a heater may be provided inside the lubricant tank of the lubricant discharge device 102 such that the heater is heated. By heating the lubricant 20 with the heater, air bubbles are generated in the lubricant 20, so that the lubricant 20 is ejected by the pressure of the air bubbles. In this case, the heater for controlling the temperature of the lubricant 20 can be concurrently used as the heater for ejecting the lubricant 20.

If the lubricant 20 is filled in the inlet space 22 of the fluid dynamic bearing 18 in an amount more than necessary, the possibility that the lubricant 20 might leak out from the reservoir 16 by unintended vibration, etc., can be high. To deal with this, the process of sucking the lubricant 20 may be further included in which, after the lubricant 20 is filled in, a nozzle for sucking the lubricant 20 is inserted inside the discharged lubricant 20 such that the lubricant 20 is sucked until the amount thereof becomes a predetermined amount. In the sucking process, the lubricant 20 is sucked while measuring the liquid height of the lubricant 20 by a measuring means, for example, a laser sensor, etc. In this case, in the manufacturing apparatus 200, the lubricant 20 discharged in an excessive amount can be sucked, allowing for the possibility that the lubricant 20 may leak out to be reduced. Further, the cost can be improved by reusing the sucked lubricant 20.

In order to enhance the work efficiency, the work of filling the lubricant 20 may be performed in a state where the lubricant 20 is heated when filled in. Heating the lubricant 20 makes the sleeve 11 and the thrust ring 12 thermally expand, which makes the capacities of the reservoir 16 and the inlet space 22 expand temporarily. As a result, the lubricant 20 is filled more smoothly inside the reservoir 16, allowing for work efficiency to be improved. It is preferable that the temperature to which the lubricant 20 is heated is within the range of 40 degree Celsius to 120 degree Celsius. When the temperature is greater than or equal to 40 degree Celsius, the capacities of the reservoir 16 and the inlet space 22 are sufficiently expanded and hence the aforementioned work of filling the lubricant can be performed smoothly and in a short period of time. In addition, when the temperature of the lubricant 20 is maintained at a temperature less than or equal to 120 degree Celsius, there is an advantage in terms of suppressing the amount of evaporation.

The case where the pressure of the first work area is reduced to a level less than or equal to 100 (Pa) has been described; however, the pressure thereof is not limited thereto. For example, the pressure of the first work area may be further reduced in accordance with improvements in time efficiency. When the pressure of the work area is reduced to a level less than or equal to 10 (Pa), it is preferable because it is difficult for air to be sucked into the lubricant 20, or when the pressure thereof is reduced to a level less than or equal to 5 (Pa), it is preferable because it is difficult for air to be dissolved into the lubricant 20.

The tip of the nozzle of the lubricant discharge device may be formed of a material softer than the material of which the fluid dynamic bearing 18 is composed, for example, a fluororesin. In this case, even if a member of the fluid dynamic bearing 18 is hit by the tip of the nozzle, it will be difficult to damage the wall surface of the member. Further, because one does not have to worry about the contact between the tip of the nozzle and the fluid dynamic bearing 18, the size of the tip of the nozzle can be large, allowing for a larger amount of the lubricant 20 to be discharged in a shorter time. Herein, forming the tip of the nozzle with a resin includes the case where the outer circumference of the tip of the nozzle is coated with a resin, etc.

The present invention has been described based on the preferred embodiments, which are only intended to illustrate the principle and applications of the invention, and it is needless to say that a variety of modifications and variations in arrangement may be made to the embodiments within the range not departing from the spirit of the invention specified in appended claims.

For example, the apparatus 200 for manufacturing the fluid dynamic bearing 18 may be secondarily used when injecting the lubricant 20 into a fluid dynamic bearing 18 that is short of the lubricant 20. Specifically, the apparatus 200 may be used when the reservoir 16 is short of the lubricant 20 because the lubricant 20 has been used over time or when a product that is short of the lubricant 20 is found by product inspection.

What is claimed is:

1. A method of manufacturing a fluid dynamic bearing that uses an apparatus for manufacturing a fluid dynamic bearing comprising a housing portion configured to define a first work area, a vacuum pump configured to discharge air in the first work area, a lubricant discharge device arranged in the first work area so as to discharge a lubricant into an inlet of a reservoir for storing the lubricant of the fluid dynamic bearing, at least one aperture provided in the housing portion, a first door configured to close the aperture, and a second door configured to close the aperture, in which, between the first door and the second door, when both have closed the aperture, a second work area is formed where the fluid dynamic bearing is placed, the method comprising:
   closing the aperture by the first door;
   arranging the fluid dynamic bearing in the second work area;
   closing the second door;
   introducing the fluid dynamic bearing into the first work area, depressurized by the vacuum pump, immediately after the first door is opened;
   discharging, by the lubricant discharging device, the lubricant into the inlet of the reservoir for storing the lubricant of the fluid dynamic bearing;
   moving the fluid dynamic bearing from the first work area to the second work area;
   closing the aperture by the first door; and
   putting air into the second work area to draw the lubricant into the reservoir for storing the lubricant of the fluid dynamic bearing
   wherein the second work area is sized in accordance with the fluid dynamic bearing and formed to be smaller in volume than the first work area.

2. The method of manufacturing a fluid dynamic bearing according to claim 1 further comprising depressurizing the second work area between the closing the aperture including the first door and the fluid dynamic bearing by the second door, and the introducing the fluid dynamic bearing into the first work area immediately after the first door is opened.

3. The method of manufacturing a fluid dynamic bearing according to claim 1 further comprising discharging additional lubricant following the drawing the lubricant into the reservoir for storing the lubricant of the fluid dynamic bearing.

4. The method of manufacturing a fluid dynamic bearing according to claim 3, wherein the discharging additional lubricant is performed in the second work area.

5. The method of manufacturing a fluid dynamic bearing according to claim 1, wherein the discharging the lubricant into the inlet of the reservoir for storing the lubricant of the fluid dynamic bearing, includes:
   determining a target position for a nozzle, located remotely from the reservoir, so that droplets of the lubricant to be ejected are placed into the inlet of the reservoir; and
   ejecting the droplets of the lubricant from the nozzle in an amount in which the lubricant does not overflow from the reservoir.

6. The method of manufacturing a fluid dynamic bearing according to claim 1 further comprising sucking the lubricant, until the amount of the lubricant becomes a predetermined amount, by inserting a nozzle for sucking the lubricant into the discharged lubricant.

7. The method of manufacturing a fluid dynamic bearing according to claim 1, wherein, in the discharging, the fluid dynamic bearing is heated.

8. The method of manufacturing a fluid dynamic bearing according to claim 1 wherein, in the introducing the fluid dynamic bearing into the first work area, the first work area is depressurized to a level less than or equal to 100 Pa.

9. The method of manufacturing a fluid dynamic bearing according to claim 1, wherein, in the discharging, the lubricant discharge device discharges the lubricant, whose temperature is within the range of 40 degree Celsius to 120 degree Celsius.

10. The method of manufacturing a fluid dynamic bearing according to claim 1, wherein at least one of the first and second doors is formed to surround a part of the fluid dynamic bearing.

11. The method of manufacturing a fluid dynamic bearing according to claim 1, wherein one fluid dynamic bearing is arranged in the first work area and a plurality of fluid dynamic bearings are arranged in the second work area.

12. A method of manufacturing a fluid dynamic bearing that uses an apparatus for manufacturing a fluid dynamic bearing comprising a housing portion configured to define a first work area, a vacuum pump configured to discharge air in the first work area, a lubricant discharge device arranged in the first work area so as to discharge a lubricant into an inlet of a reservoir for storing the lubricant of the fluid dynamic bearing, at least one aperture provided in the housing portion, a first door configured to close the aperture, and a second door configured to close the aperture, in which, between the first door and the second door, when both have closed the aperture, a second work area is formed where the fluid dynamic bearing is placed, the method comprising:
   closing the aperture by the first door;
   arranging the fluid dynamic bearing in the second work area;
   closing the second door;

causing the second work area with higher pressure than the first work area to communicate with the first area depressurized by the vacuum pump, and introducing the fluid dynamic bearing into the first work area, by opening the first door;

discharging, by the lubricant discharging device, the lubricant into the inlet of the reservoir for storing the lubricant of the fluid dynamic bearing;

moving the fluid dynamic bearing from the first work area to the second work area;

closing the aperture by the first door; and putting air into the second work area to draw the lubricant into the reservoir for storing the lubricant of the fluid dynamic bearing.

13. The method of manufacturing a fluid dynamic bearing according to claim 12, wherein the second work area is smaller than the first work area and is sized in accordance with the fluid dynamic bearing to be manufactured.

14. The method of manufacturing a fluid dynamic bearing according to claim 12, wherein the first work area is provided with only one door that the fluid dynamic bearing passes through.

15. A method of manufacturing a fluid dynamic bearing that uses an apparatus for manufacturing a fluid dynamic bearing comprising a housing portion configured to define a first work area, a vacuum pump configured to discharge air in the first work area, a lubricant discharge device arranged in the first work area so as to discharge a lubricant into an inlet of a reservoir for storing the lubricant of the fluid dynamic bearing, one aperture provided in the housing portion, a first door configured to close the aperture, and a second door configured to close the aperture, in which, between the first door and the second door, when both have closed the aperture, a second work area is formed where the fluid dynamic bearing is placed, the method comprising:

closing the aperture by the first door;

arranging the fluid dynamic bearing in the second work area;

closing the second door;

opening the first door and introducing the fluid dynamic bearing into the first work area depressurized by the vacuum pump via the aperture;

discharging, by the lubricant discharging device, the lubricant into the inlet of the reservoir for storing the lubricant of the fluid dynamic bearing;

moving the fluid dynamic bearing from the first work area to the second work area via the aperture;

closing the aperture by the first door; and putting air into the second work area to draw the lubricant into the reservoir for storing the lubricant of the fluid dynamic bearing.

16. The method of manufacturing a fluid dynamic bearing according to claim 15, wherein the second work area is smaller than the first work area and is sized in accordance with the fluid dynamic bearing to be manufactured.

17. The method of manufacturing a fluid dynamic bearing according to claim 15 further comprising depressurizing the second work area between the closing the aperture including the first door and the fluid dynamic bearing by the second door, and the introducing the fluid dynamic bearing into the first work area immediately after the first door is opened.

18. The method of manufacturing a fluid dynamic bearing according to claim 15, wherein the introducing of the fluid dynamic bearing into the first work area is performed by causing the second work area with higher pressure than the first work area to communicate with the first area depressurized by opening the first door.

19. The method of manufacturing a fluid dynamic bearing according to claim 15, wherein the first door is concurrently used as a table on which the fluid dynamic bearing is arranged, and the first door closes the aperture from inside.

20. The method of manufacturing a fluid dynamic bearing according to claim 15, wherein the discharging of the lubricant is performed while the fluid dynamic bearing is being mounted on the first door.

* * * * *